Nov. 20, 1928.
O. EXSTERNBRINK
1,692,162
WALL COFFEE MILL FOR TWO DIFFERENT GRINDING MATERIALS
Filed Sept. 27, 1926
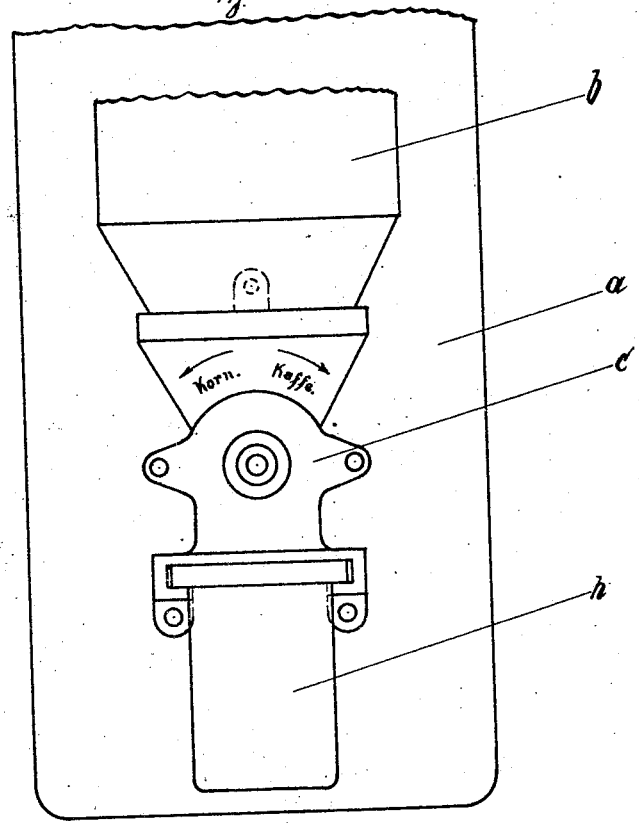
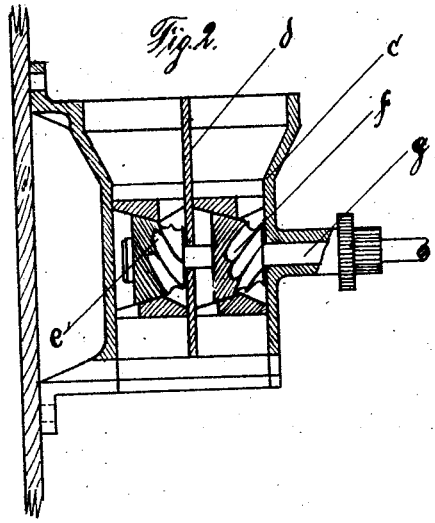

Patented Nov. 20, 1928.

1,692,162

UNITED STATES PATENT OFFICE.

OTTO EXSTERNBRINK, OF WESTHOFEN, GERMANY.

WALL COFFEE MILL FOR TWO DIFFERENT GRINDING MATERIALS.

Application filed September 27, 1926, Serial No. 138,050, and in Germany September 25, 1925

This invention relates to a coffee-mill to be fixed on a wall and designed for grinding two different materials. The coffee mill comprises a separate collecting chamber and a separate grinding mechanism for each kind of material, the grinding mechanisms being mounted on a common axle.

In coffee mills of the type referred to it has, up to the present, not been possible to make the grinding mechanisms work each one separately, the other one running idle, by rotating to the right or left the common axle. Up to the present two parallel axles were required, each axle carrying one grinding mechanism said mechanisms being coupled the one with the other by a pair of wheels. This arrangement presents, in comparison with coffee-mills having only one grinding mechanism, the inconvenience that the construction of the coffee mill is complicated and the size enlarged by the provision of two axles, double bearings and a pair of coupling wheels, which have to be enclosed in a casing in order to avoid injury.

According to the invention these inconveniences are avoided by mounting, both in the same direction, on a common axle two grinding cones, one for each material, having oppositely directed grinding edges, by providing on said axle a crank handle to rotate the axle in the one or other direction to grind the one or other material.

An embodiment of the invention is shown, by way of example, in the accompanying drawing in which Fig. 1 is a front elevation of the improved coffee-mill.

Fig. 2 shows the grinding mechanism in section.

The reservoir $b$ for the grinding material, fixed on a wall board $a$, is subdivided into two compartments by a vertical partition, one compartment being designed for unground coffee the other for unground corn. The partition $d$ is extended downward through the casing $c$ for the grinding mechanism and to the collector $h$ for the ground materials. On each side of the partition $d$ a grinding mechanism $e$ and $f$ respectively is mounted on the same crank shaft $g$. The grinding mechanism $e$ operates when the axle is rotated in right hand direction and the grinding mechanism $f$ operates when the axle is rotated in left hand direction. The two grinding mechanisms are arranged the one in alignment with the other so that one adjusting device can serve for both mechanisms. On the front side of the casing arrows and inscriptions are painted which indicate the direction of rotation for each grinding material.

I claim:—

A wall-coffee-mill for two different grinding materials, comprising in combination a separate shell for each grinding material, an axle, two grinding cones one for each grinding material mounted on said axle both in the same direction, and having oppositely directed grinding edges, and a crank handle on said axle for rotating the same in the one or other direction to grind the one or other material.

In testimony whereof I affix my signature.

OTTO EXSTERNBRINK.